United States Patent
Cheng et al.

(10) Patent No.: US 7,363,048 B2
(45) Date of Patent: Apr. 22, 2008

(54) APPARATUS, AND ASSOCIATED METHOD, FOR OPERATING UPON DATA AT RLP LOGICAL LAYER OF A COMMUNICATION STATION

(75) Inventors: Mark W. Cheng, San Diego, CA (US); Liangchi Hsu, San Diego, CA (US)

(73) Assignee: Nokia Corporation, Espoo (FI)

( * ) Notice: Subject to any disclaimer, the term of this patent is extended or adjusted under 35 U.S.C. 154(b) by 1040 days.

(21) Appl. No.: 10/414,482

(22) Filed: Apr. 15, 2003

(65) Prior Publication Data
US 2004/0018846 A1   Jan. 29, 2004

Related U.S. Application Data

(60) Provisional application No. 60/372,528, filed on Apr. 15, 2002.

(51) Int. Cl.
*H04B 7/00* (2006.01)
(52) U.S. Cl. .................. 455/517; 455/575
(58) Field of Classification Search ........ 455/517, 455/575, 428, 466, 556, 524
See application file for complete search history.

(56) References Cited

U.S. PATENT DOCUMENTS

| | | | |
|---|---|---|---|
| 5,940,771 A * | 8/1999 | Gollnick et al. ............ 455/517 |
| 6,349,224 B1 * | 2/2002 | Lim ......................... 455/466 |
| 6,507,582 B1 | 1/2003 | Abrol | |
| 6,581,176 B1 | 6/2003 | Seo | |
| 6,657,388 B2 | 12/2003 | Wijenberg et al. | |

FOREIGN PATENT DOCUMENTS

WO     WO0069147     11/2000

* cited by examiner

*Primary Examiner*—Creigthton Smith
(74) *Attorney, Agent, or Firm*—Banner & Witcoff, Ltd.

(57) ABSTRACT

Apparatus, and an associated method, for controlling RLP logical layer operations of a communication station, such as a mobile station or base transceiver station of a CDMA communication system that provides for both 1xRTT and 1xEV-DV communications. Modifications to existing data service options at the RLP logical layer are provided to facilitate RLP operations.

19 Claims, 4 Drawing Sheets

APPARATUS, AND ASSOCIATED METHOD, FOR OPERATING UPON DATA AT RLP LOGICAL LAYER OF A COMMUNICATION STATION

CROSS REFERENCE TO RELATED APPLICATIONS

The present application claims the priority of provisional patent application No. 60/372,528 filed on Apr. 15, 2002.

The present invention relates generally to a manner by which to modify RLP (radio link protocol) operations at a communication station, such as a mobile station or a radio base station, operable in a CDMA 2000 cellular communication system that provides for high-speed data services. More particularly, the present invention relates to apparatus, and an associated method, by which to control RLP layer operation at a communication station, selectably, to operate upon high-speed data, such as 1xEV-DV data, formed pursuant to a first data scheme and to operate upon high-speed data, such as 1xRTT data, formed pursuant to a second data scheme.

RLP procedures are modified, e.g., to support 1xEV-DV data communication at a physical layer of the radio communication system. Scheduling efficiency is improved and data transfer throughput performance is improved.

BACKGROUND OF THE INVENTION

A communication system provides for the communication of data between two or more locations. Communication of data is required to effectuate many different types of communication services. The needs and demands for the effectuation of such communication services is an endemic part of modern society.

A communication system includes, at a minimum, a first communication station, and a second communication station connected by way of a communication channel. At least one of the communication stations forms a sending station, and another of the communication stations forms a receiving station. Data is communicated by the sending station upon the communication channel to be detected and received by the receiving station. Data is first converted, at the sending station, into a form to permit its communication upon the communication channel. And, the receiving station works in reverse manner to recover the informational content of the data communicated thereto.

A radio communication system is a type of communication system in which the communication channels used therein are defined upon radio links extending between the communication stations. A radio link is defined upon a portion of the electromagnetic spectrum. In contrast, wire line communication systems generally require a fixed connection, i.e., a wire line connection, between communication stations upon which to form communication channels to permit the communication of data there between.

Radio communication systems provide various advantages when compared to their wire line counterparts. The physical infrastructure of a radio communication system is generally relatively less costly to install than that of a corresponding wire line communication system. Installation and deployment costs, therefore, of a radio communication system are generally less than those of corresponding wire line communication systems. And, a radio communication system is amenable for implementation as a mobile communication system in which communication mobility is provided in the form of a mobile radio communication system.

A cellular communication system is a type of mobile radio communication system. Cellular communication systems have been developed and deployed to encompass many populated portions of the world. Radio communications are effectuated during operation of the cellular communication system between a network part of the communication system and mobile stations that are positionable in a geographical area encompassed by a cellular communication system.

The network part of the cellular communication system includes base transceiver stations that are installed at spaced-apart locations throughout the geographical area to be encompassed by the system. Each base transceiver station defines a cell, which is a geographic subportion of the area encompassed by the communication system. The base transceiver stations are connected through additional elements of the network to an external network, such as a PSTN (Public Switch Telephonic Network) or the Internet.

When a mobile station is within a cell defined by a particular radio base station, communications by, and to, the mobile station are generally effectuated with the radio base station that defines the cell. Due to the inherent mobility of the mobile station, however, the mobile station might travel out of the cell defined by a first radio base station and into a cell defined by another radio base station. Handovers of communications are effectuated to permit continued communications with the mobile station.

Cellular communication systems, as well as various other communication systems, are constructed to comply with operating parameters set forth in an appropriate operating specification. Operating specifications are promulgated by standard setting bodies, such as the EIA/TIA. Which respect to cellular communication systems, various operating specifications have been promulgated. Operating specifications have been promulgated relating to different communication technology types, as well as to successive generations of systems that take advantage of advancement in communication technologies as they become available. Corresponding, successive generations of cellular communication networks have been installed throughout wide areas to permit telephonic and communications to be effectuated there through.

Cellular communication systems that were first implemented are generally referred to as being first generation systems. First generation systems generally utilize analog communication techniques. Second generation cellular communication systems generally utilize digital communication techniques. Third generation cellular communication systems are undergoing standardization procedures and initial deployments. And, successor-generation systems are also under development. Third generation, and successor generation, systems also utilize digital communication techniques and provide for data communications at higher data rates.

The operating parameters are of an exemplary third generation communication system is set forth in an operating specification referred to as the CDMA 2000 operating specification. The operating parameters set forth in the CDMA 2000 operating specification provides for packet base data communication services. The data communication services are effectuable at high data rates.

A first data communication scheme provided for CDMA 2000compliant communication systems is referred to as 1xRTT. Data formatted pursuant to the operating parameters defined pursuant to the 1xRTT communication scheme defines a frame size, frame duration, data rate, shared/ dedicated channels of communications, and other operating parameters unique thereto.

Another data communication scheme provided for CDMA 2000compliant communication systems is referred to as 1xEV-DV. Data formatting pursuant to the operating parameters defined pursuant to the 1xEV-DV communication scheme also define frame sizes, frame durations, data rates, and other operating parameters unique thereto. And in particular, some of the operating parameters of the 1xEV-DV scheme differ with corresponding parameters of the 1xRTT scheme. Modification of existing data service options in a system that provides for 1 xRTT data communications are necessary in order to support 1xEV-DV.

The radio link protocol (RLP) is an enabling protocol for CDMA 2000 data services and applications. The RLP, however, exhibits various inherent limitations when the underlying technology is evolved towards CDMA 2000 I xEV-DV data communications. The limitations of RLP are, in significant part, due to the evolution of the physical layer advancement. For example, the physical layer frame length is changed in 1xEV-DV. A shared, so-called "fat a pipe" packet data channel is utilized in 1xEV-DV. Multiplexing of high-speed data and other controlling information into the shared channel is possible in 1xEV-DV. The 1xEV-DV communication scheme defines a forward packet data channel (F-PDCH). The data frame length of data communicated pursuant to 1xEV-DV is, selectably, 1, 2, or 4 times 1.25 ms slots.

In contrast, prior to the inclusion, i.e., definition, of the F-PDCH, the frame size used at the physical layer is a unit of N×20 ms, N=1, 2, or 4.

Comparison of the possible frame sizes indicates that a finer granularity of physical layer time interval is specified in the 1xEV-DV communication scheme. This impacts the upper layer scheduling function and, also, the RLP behavior at communication stations, i.e., the mobile station and the base station, of a communication system that provides for such high-speed data services.

The current CDMA 2000 1xRTT RLP frame format is defined with the assumption that RLP frames are transmitted only on fundicated (fundamental) or supplemental channels. These channels are 20 ms frame basis channels. RLP is a connection-oriented, and NAK (Negative Acknowledgement)-based data delivery protocol. In the existing RLP 3 definition, data transfer procedure is based upon the 20 ms time period for transmitting and receiving procedures to accommodate the 20 ms frame channel structure. In other words, once every 20 milliseconds, the transmitting or receiving RLP performs RLP data frame transmission or receiving, or processing, control frames in a synchronous manner. Additionally, all RLP timing and timer related functions are also 20 ms base, e.g., NAK processing and its associated timer, idle frame transmission and it associated time etc., are all based upon the 20 ms time interval. The inherent association between the existing CDMA 2000 1xRTT RLP specification and the 20 ms timing reference creates problems with optimal functioning of CDMA 2000 1xEV-DV communications.

Accordingly, various issues emerge with respect to the RLP due to the finer granularity, i.e., the 1.25 ms physical layer length of 1xEV-DV.

If a manner could be provided by which to provide for compatibility, at the RLP layer, between the separate communication schemes that exhibit the separate timing references, improved communication performance of 1xEV-DV data communications would be possible.

It is in light of this background information related to data communications in a cellular communication system that the significant improvements of the present invention have evolved.

SUMMARY OF THE INVENTION

The present invention, accordingly, advantageously provides apparatus, and an associated method, by which to modify RLP (Radio Link Protocol) operations at a communication station, such as a mobile station or a radio base station, operable in a CDMA 2000 cellular communication system that provides for high-speed data services.

Through operation of an embodiment of the present invention, a manner is provided by which to control RLP-layer operations at a communication station. The communication station selectably operates upon high-speed data, such as 1xEV-DV data, formed pursuant to a first data scheme and to operate upon high-speed data, such as 1xRTT data, formed pursuant to a second data scheme.

Scheduling efficiency is improved, and data transfer throughput performance is also improved. RLP procedures at a communication station are modified to support 1xEV-DV data communications as well as 1xRTT data communications.

In one aspect of the present invention, two modes of RLP operations are provided at the RLP layer of a communication station. In the separate modes, the difference of frame size and channel structure between the 1xRTT and 1xEV-DV schemes are accommodated. A first mode forms a slot mode, and a second mode forms a frame mode. The modes are also selectably operable simultaneously. Advantage is taken of the 1.25 millisecond length of a slot forming a fractional part of a 20 ms frame. When operated in a slot mode of operation, RLP layer data operations are performed on a time slot basis, e.g., once every 1.25 ms interval. And, additionally, when in the frame mode, and also in the slot mode, additional RLP layer operations are performed. Operations performed at the 20 ms interval are performed when the RLP layer is operated in the slot mode upon operations that do not require fine granularity, such as round trip delay calculations and idle timer controls.

In another aspect of the present invention, a scheme is provided by which RLP formatted frames are communicated upon the F-PDCH (forward packet data channel) defined pursuant to the 1xEV-DV communication scheme. RLP format A frames and RLP format B frames are communicated upon the F-PDCH by encapsulating the frames and MuxPDU Type 5. RLP format C frames and RLP format D frames are also communicated upon the F-PDCH. The format C frame is treated, figured as predictable fixed size capable of communication within an encoder packet unit size defined in 1xEV-DV for communication on the FPDCH. And, the format D frame is also formatted in terms of the encoder packet size of an F-PDCH encoder packet.

In another aspect of the present invention, a manner is provided by which to interface RLP frames supplied by a multiplex layer with an FPDCH data block. When the forward packet data channel is used, RLP frames are carried only in an F-PDCH data block. That is to say, when the forward packet data channel is supported and used, any RLP traffic communicated pursuant to effectuation of a communication service is carried by way of the forward packet data channel, even if I xRTT fundicated or supplemental channels are in service and otherwise available for use.

Thereby, existing RLP 3 procedures are enhanced and frame formats are provided to support communications upon the forward packet data channel. Mixed modes of RLP operations are provided, RLP frame formats are alerted to permit communications upon a forward packet data channel defined pursuant to 1xEV-DV communications, and an RLP instance interfaces to the multiplex layer with the forward packet data channel data block.

In these and other aspects, therefore, apparatus, and an associated method, is provided for a radio communication system. The radio communication system has at least a first communication station for communicating data. The data is selectably of a selected multiple of the first data length and of a second data length. The first data length is a fractional portion of the second data length. The data is operated upon at an RLP (radio link protocol) logical layer of the at least the first communication station, selectably of the selected multiple of the first data length and the second data length. An RLP (radio link protocol) controller is adapted to receive indication of which of at least of the selected multiple of the first data length and the second data length into which the data is formed. The controller controls time-based data operations at the RLP logical layer upon the data at intervals corresponding to which of the at least one of the first data length and the second data length into which the data is formed.

A more complete appreciation of the present invention and the scope thereof can be obtained from the accompanying drawings that are briefly summarized below, the following descriptions of the presently-preferred embodiments of the invention, and the appended claims.

DETAILED DESCRIPTION

Figure 1:
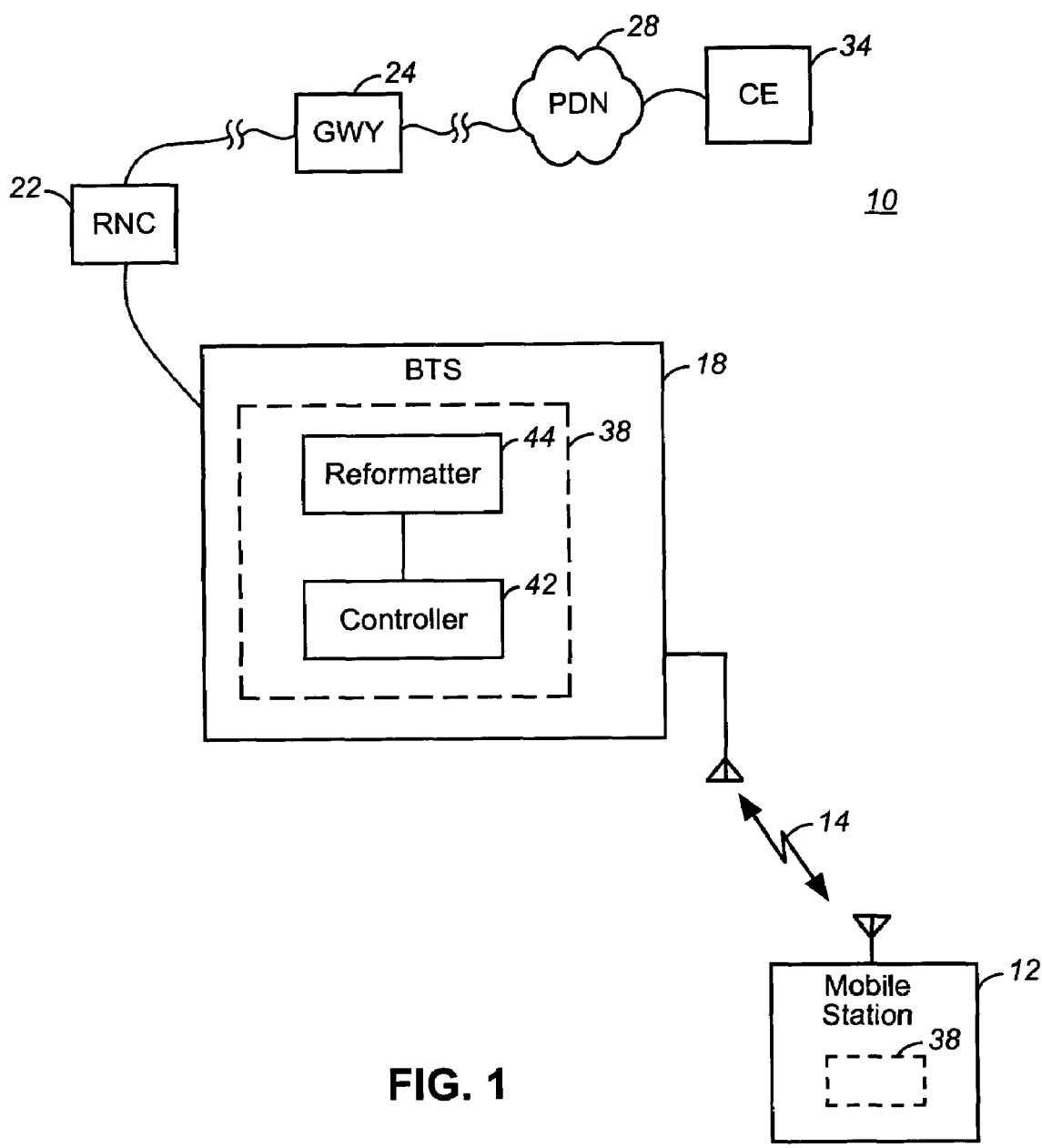
FIG. 1 illustrates a functional block diagram of an exemplary radio communication system in which an embodiment of the present invention is embodied.

Referring first to FIG. 1, a radio communication system, shown generally at 10, provides for the effectuation of radio communications with mobile stations, of which a single, representative mobile station is shown in the Figure. In the exemplary implementation, the radio communication system forms a cellular communication system. The cellular communication system operates on a generally, pursuant to the operating parameters set forth in the CDMA 2000 operating specification.

And, more particularly, the CDMA 2000 system further provides for high data rate communication services that are generated pursuant to an 1xRTT communication scheme as well as pursuant to a 1xEV-DV communication scheme.

While the following description shall describe operation of an embodiment of the present invention with respect to its implementation in a cellular communication system operable generally pursuant to the CDMA operating specification and that provides for 1xRTT and 1xEV-DV data communications, the teaching of the present invention are also implementable in any of various other types of communication systems.

The mobile station 12 communicates by way of radio channels defined upon a radio air interface formed between the mobile station and the network part of the communication system. The arrow 14 is representative of radio channels defined upon the radio air interface. Various channels are defined of various channel characteristics, all as defined in the operating specification pursuant to which the communication system is constructed to be operable. Forward-link channels are defined upon which data originated at the network part of the communication system are communicated to the mobile station. And, reverse-link channels are defined upon which to communicate data originated at the mobile station to the network part.

Various elements of the network part are shown in the figure. A base transceiver station 18 forms a portion of the network part. The base transceiver station includes transceiver circuitry, formed of a transmit portion and a receive portion, capable of transducing radio signals that are communicated upon the radio channels defined upon the radio air interface. The base transceiver station is coupled to a control device, here a radio network controller (RNC) 22. The radio network controller operates, amongst other things, to control operation of the base transceiver station. The radio network controller, in turn, is coupled to a radio gateway (GWY) 24.

The gateway forms a gateway with a communication network, here represented by a packet data network (PDN) 28. The packet data network forms, for instance, the Internet backbone. A correspondent entity (CE) 34 is coupled to the network 28. The correspondent entity is representative of any data source or data sink at which data is sourced or terminated.

As mentioned previously, 1xRTT and 1xEV-DV data formats differ. To 1xRTT format is based upon a 20 millisecond frame length, while the 1xEV-DV format is predicated upon 1.25 ms slots. The base transceiver station and the mobile station each include apparatus, shown generally at 38, of an embodiment of the present invention. The apparatus 38 facilitates, at an RLP logical layer, in a control mechanism by which to facilitate proper functioning of 1xEV-DV communication services as well as data formatted pursuant to 1xRTT communication services.

The apparatus 38 includes a RLP logical layer controller 42 and a reformatter 44. The RLP controller 42 operates the control operations of the communications station at which the apparatus is embodied at the RLP logical layer. And, the reformatter 44 operates selectably to reformat data to permit its communication upon a forward packet data channel defined pursuant to the 1xEV-DV communication service.

Figure 2:
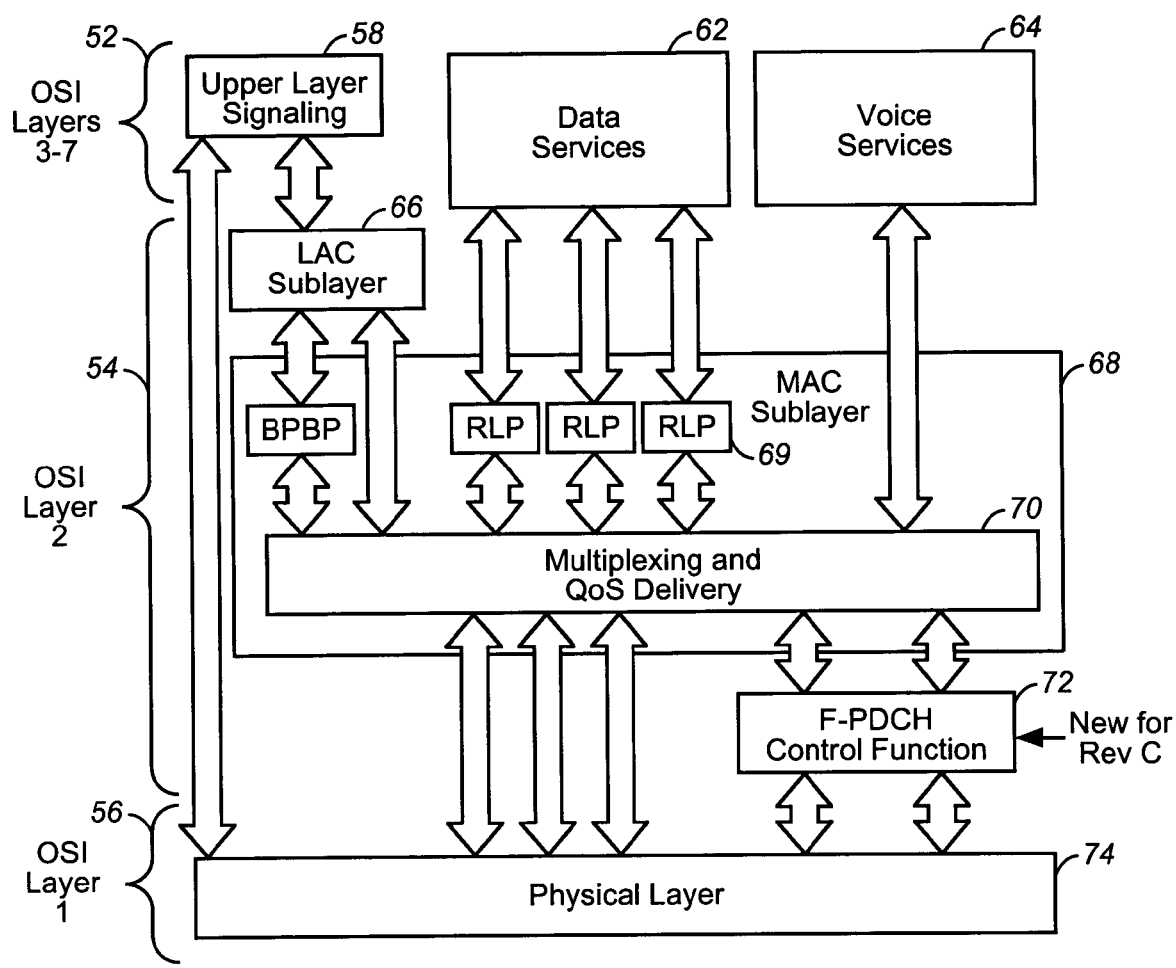
FIG. 2 illustrates a functional block diagram of the logical layer architecture defined in the CDMA 2000 communication scheme that provides for 1xEV-DV data communications and of which the exemplary radio communication system shown in FIG. 1 is formed.

FIG. 2 illustrates the logical layer arrangement of a communication station, such as the mobile station 12 or base transceiver station 18 of the communication system shown in FIG. 1. Here, the logical layer structure is divided into three parts, an OSI layer 3-7 part 52, an OSI layer 2 part 54, and an OSI layer 1 part 56.

The part 52 is representative of upper-level layers, here indicated as upper layer signaling 58, data services 62, and voice services 64. The data services 62 are representative of both 1xRTT and 1xEV-DV data.

The layer 54 includes an LAC sublayer 66 and an MAC sublayer 68. And, as illustrated, at the MAC sublayer, RLP 69, SRBP, and multiplexing and QOS delivery functions 70 are performed. And, at the portion 54, F-PDCH control functionality is provided, indicated at the block 72.

The portion 56 is formed of the physical layer, here represented at 74.

Figure 3:
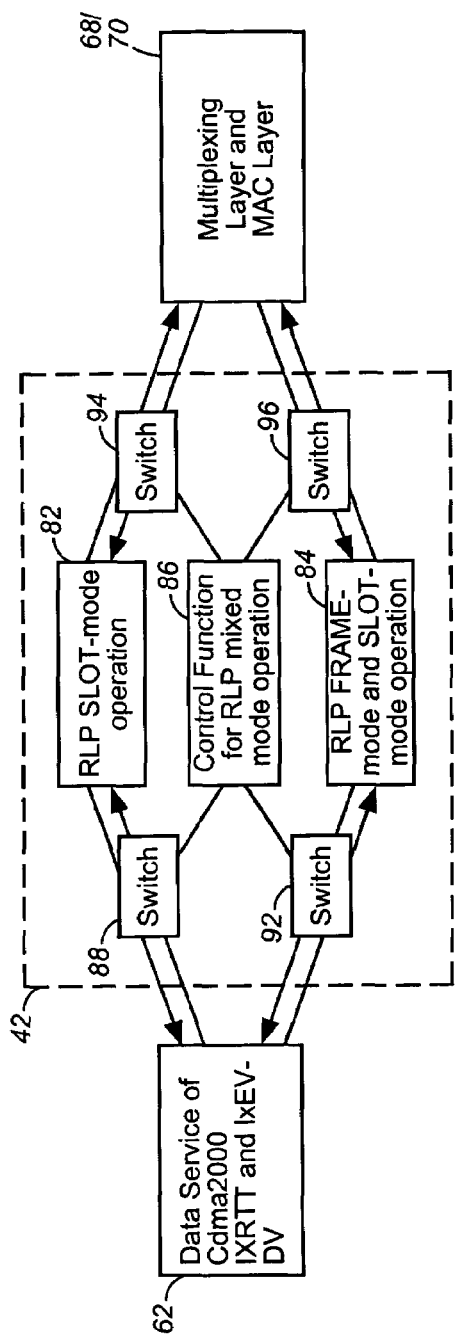
FIG. 3 illustrates a first partial functional block, partial logical diagram of a portion of the communication system shown in FIG. 1.

FIG. 3 illustrates the controller 42 that forms a portion of the apparatus 38 (shown in FIG. 1) of an embodiment of the present invention. The controller causes operation of the communication station at which the apparatus is embodied selectably to be operable in an RLP Slot mode of operation, here indicated at the block 82 or, at least, a frame mode and slot mode operation, here represented by the block 84. The control function performed by the controller 42 is indicated at the block 86. And, pursuant to the control function, functional switching is effectuated, indicated by the switches 88, 92, 94, and 96. The multiplexing function 70 of the MAC sublayer 68 is again shown. And, the data services function 62, representative of both 1xRTT and 1xEV-DV data is also again shown.

Operation of the control function 86 of the controller is determinative of in which mode of operation that the communication station operates. The separate modes of operation accommodate the different sizes of frames and channel structures defined between the CDMA 2000 1xRTT and CDMA 2000 1xEV-DV data. As indicated by the block 84, the two modes are operable simultaneously, if selected. Depending upon a system timing reference, the slot and frame are defined in a way data slot is a subset of a frame, and a frame is a multiple unit of slots.

When the forward packet data channel, F-PDCH, is supported and assigned, device operability must be capable of handling data transfer procedures at every 1.25 millisecond interval.

Figure 4:
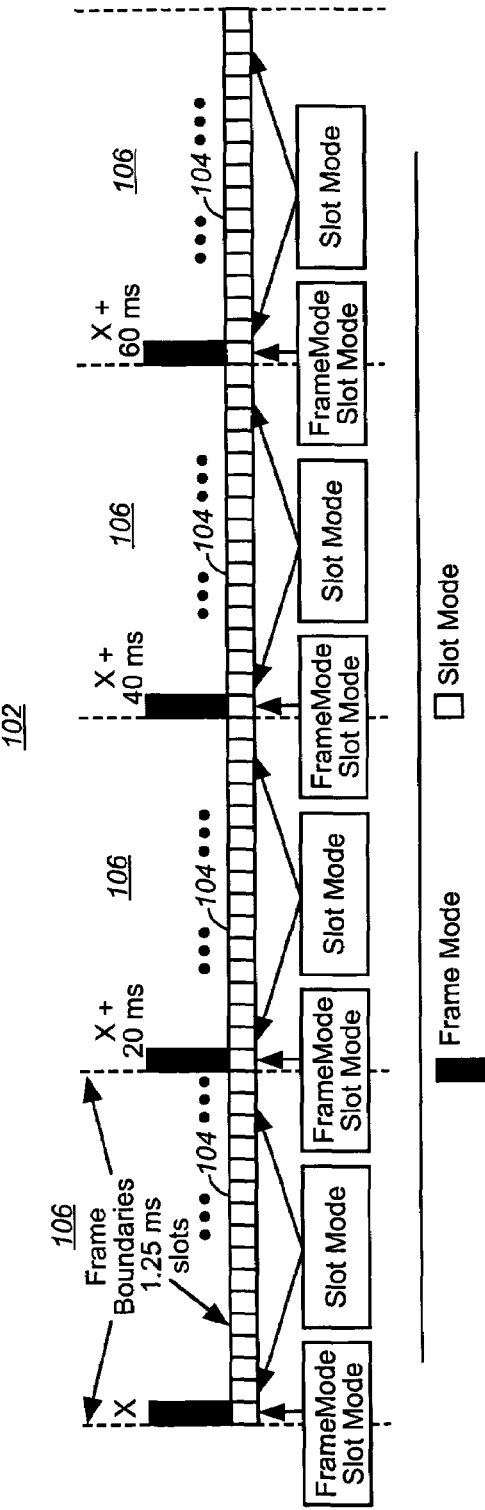
FIG. 4 illustrates a timing diagram representative of the timing of operations performed by the apparatus forming an embodiment of the present invention during the various modes of operation permitted by the embodiment of the present invention.

FIG. 4 illustrates a timing diagram, shown generally at 102, representative of the relationship between the 1.25 ms times slots utilized in 1xEV-DV and 20 ms frames utilized in 1xRTT operations. The time slots are indicated at 104, and the frames are indicated at 106. As a frame is of a 20 ms duration, sixteen time slots 104 are formed in each frame. Slot-defined operations are performed during each time slots, and frame-defined operations are performed during each frame. RLP procedures are combined into the 2 modes of operation.

When the communication station is operated in the slot mode, the RLP performs various operations during each time slot. Namely, when operated in conjunction with a receive part of the associated communication station, the RLP performs decoding, verification, and processing operations upon the received RLP frames. The RLP processes the received frame in every slot if F-PDCH is supported. When used in conjunction with the transmit part of the associated communication station, encoding, generation, and transmission of the RLP frame is performed in every slot. When inquired of by the multiplexing function 70, the RLP generates data or control frames and supplies them to the multiplexing function. Additionally, identical, retransmitted frames are not normally supplied in the same 1.25 ms time slot. To increase reliability of delivery, multiple NAK (negative acknowledgement) requests are sent when a NAK is sent responsive to a missing frame. To minimize the possibility that an RLP receiver loses retransmitted copies due to a frame error, the identical retransmitted data frame is preferably not supplied during the same 1.25 ms time slot.

When operated in the frame/slot mode, indicated by the block 84, the RLP performs functions in addition to those just-described with respect to the slot mode operation. During each 20 ms frame, the RLP performs roundtrip delay calculations between peer RLPs, if required. The roundtrip delay calculation does not need to have fine granularity for the reason that the roundtrip delay is used to set a of retransmit timer. And, the timer is at least, e.g., 100 ms greater than the roundtrip delay time so that the precision of the roundtrip delay time at a slot level is not required. And, not both data traffic directions, e.g., a current reverse link inside the mobile, can support the 1.25 ms slot, the 20 ms timer procedure is simpler and consistent across both directions of data flow. Idle timer control is also performed during each frame. Idle frames are sent at the end of the data transmission for a receiver to confirm the last transmitted data frames. The timing of the idle frame transmission is related to the timing of the roundtrip delay. Thus, the timer is decremented in the same manner as the roundtrip delay timer. Frame mode operation provides the benefit of reduced processing. Instead of performing the operations during each time slot, the RLP performs the timer procedures only once during every 16 time slots. When implemented at a mobile station, battery power savings also result as a result of the reduced processing.

The reformatter 44 (shown in FIG. 1) also provides a scheme by which RLP frame formats are supported for communication on the FPDCH defined pursuant to 1xEV-DV. The RLP format A and B frames are used to carry fundicated control or data frames. And, RLP format C and D frames are used for supplemental data frames. The various RLP frames are reformatted or otherwise made to fit into F-PDCH byte boundary frames. Format A and format B frames are MuxPDU Types 1 and 2 frames that are able to be encapsulated into MuxPDU Type 5 frames. And, the reformatter 44 operates to permit the communication of format C and format D type RLP frames on the F-PDCH.

A format C frame is used upon the fixed size Supplemental Channel (SCH). And, the same data frame is also used to transmit F-PDCH encoder packets. The encoder packet unit size for the F-PDCH subpacket transmission is 384, or a multiple thereof, bits. The data is thereby treated as a predictable fixed size and can be placed into an octet boundary without padding as indicated in the table below. If the packet unit size is 384 bits, format C data frame is defined as follows:

| Field | Length (bits) |
|---|---|
| Type | 2 |
| SEQ | 8 |
| Data | 368 |

Wherein Type is the Frame type. The Type field is set to "10" for a new data frame and set to "11" for a transmitted frame. SEQ is a field that contains the least significant 8 bits of the sequence number of the data frame. And, Data refers to data octets. The length of this field is 368 bits (48 octets). This is 384 bits less the 6 bits of an MuxPDU header and 10 bits of a format C header.

The following table indicates the lengths of data field for other FPDCH encoder packet sizes.

| Multiplex Sublayer SDU Size (bits) | RLP Data Size (bits) |
| --- | --- |
| 384 | 368 |
| 768 | 752 |
| 1536 | 1520 |
| 2304 | 2288 |
| 3072 | 3056 |
| 3840 | 3824 |

RLP format D frames are also communicated upon F-PDCH. Format D frames are variable length frames. A length field in the frame is not required as the MuxPDU Type 5, used by the F-PDCH has a length indicator. The format D frame in F-PDCH is defined as set forth in the following table. The data length, in bits, is a basic block size of the FPDCH encoder packets. Other encoder packet sizes are multiples of 384 bits.

| Field | Length (bits) |
| --- | --- |
| TYPE | 2 |
| SEQ | 8 |
| SSP | 1 |
| SQ1 | 1 |
| LAST_SEQ | 1 |
| REXMIT | 1 |
| SEQ_HI | 0 or 4 |
| S_SEQ | 0 or 12 |
| Padding_1 | 4 |
| Data | 8 × 45 = 360 |
| Padding_2 | 0 |

Type—Frame type.
SEQ—This field contains the least significant 8 bits of the data frame's sequence number.
SSP—S_SEQ present indicator. It is set to "1" is S_SEQ present. "0" otherwise.
SQ1—SEQ 8/12 bit indicator. A value of "0" indicates that SEQ_HI is omitted; a value of "1" indicates SEQ_HI is included.
LSAT_SEQ—Last segment indicator. This bit is set to "1" to indicate the last segment of a segmented retransmission. It is set to "0" otherwise.
REXMIT—Retransmitted frame indicator. This bit is set to "1" when the frame is a retransmitted data frame or segment. Otherwise, it is set to "0".
SEQ_HI—This field shall contain the 4 most significant bits of L_SEQ. The field is included if SQ1 is set to "1".
S_SEQ—12-bit octet sequence number (counted from the start of the frame) of the first byte in this segment of the frame.
Padding_1—Padding bits required to octet align the data field, in relation to the beginning of the SEQ field. These bits shall be set to "0".
Data—Data octets. The number of data octets is specified by the LEN field or, for multiplex option 0xf20, by the multiplex sublayer.
Padding_2—Padding bits. As required to fill the reminder of the frame. These bits shall be set to "0".

For other F-PDCH encoder packet sizes, the lengths of the data field are as noted in the following Table. The Table assumes that neither SEQ_HI nor S_SEQ fields are present.

| Multiplex Sublayer SDU Size (bits) | RLP Data Size (bits) |
| --- | --- |
| 384 | 360 |
| 768 | 744 |
| 1536 | 1512 |
| 2304 | 2280 |
| 3072 | 3048 |
| 3840 | 3816 |

All RLP frames are supplied to the multiplexing layer 70 to be carried in an F-PDCH data block are referred to as F-PDCH RLP frames. As the MAC layer permits all existing MuxPDU types to be encapsulated and carried within an MuxPDU Type 5 frame, operation of an embodiment of the present invention also makes possible that the RLP frames to be carried only in F-PDCH data blocks whenever the F-PDCH is utilized. That is to say, when the F-PDCH channel is supported and used, any RLP traffic for data service inherently otherwise communicated upon a 1xRTT Fundicated or Supplemental Channel is instead carried upon an F-PDCH, even if the legacy channels are in service. Additionally, all RLP frames, both RLP data frames and RLP control frames, are carried by the F-PDCH, only whenever F-PDCH is utilized for the data instance.

Figure 5:
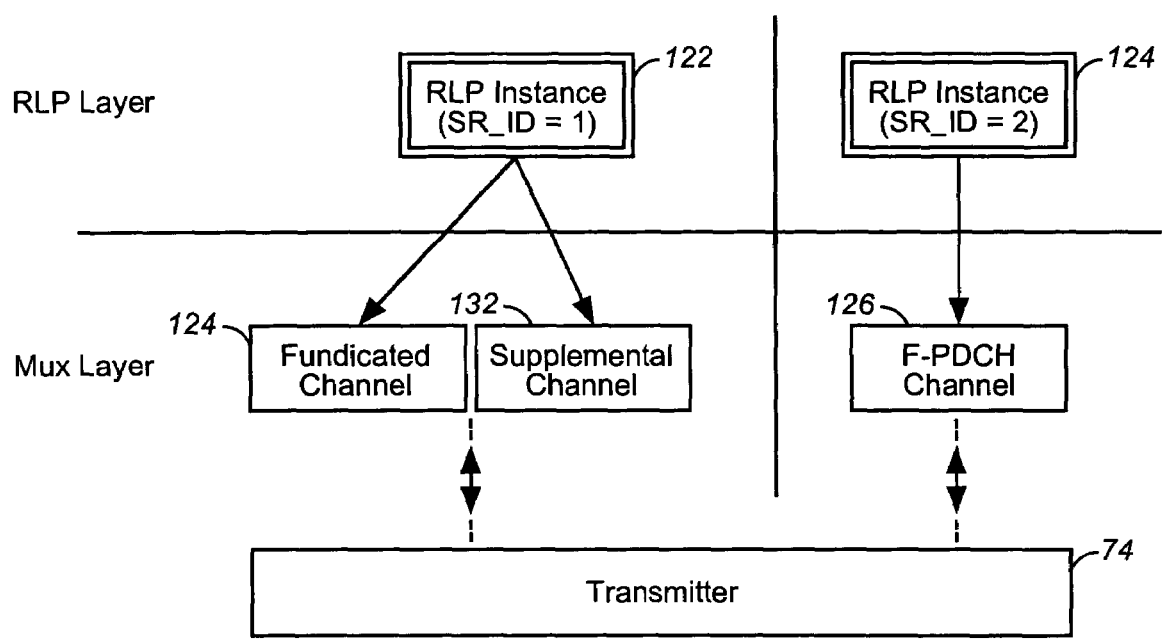
FIG. 5 illustrates representations of two service instances including a service instance in which RLP format data is communicated by way of a forward packet data channel pursuant to an embodiment of the present invention.

FIG. 5 illustrates exemplary service instances together with their interface with separate channels. Here, all RLP control and data frames contained in a 384 bits encoder packet are concatenated wherein the RLP control frame a highest priority if a NAK control frame is required to be sent urgently and another MuxPDU Type I data frame is sent in the same F-PDCH encoder packet.

Block 122 represents a circuit or a circuit-like service while block 124 is representative of a packet data service. The RLP instance represented by the block 124 uses the F-PDCH, here indicated at 126, to carry its traffic. Fundicated data frames are not generated by the RLP instance indicated by the block 124 or carried upon the fundicated channels, indicated by the block 128. The supplemental channel indicated by the block 132. And, the RLP instance indicated by the block 122 is shown to be communicated upon the channels 128 and 132. Mixing both the RLP control frames and RLP data frames into the F-PDCH provides benefits. For instance, such operation relieves the dependency of using a fundicated channel to carry the RLP control frames. Simplification is also provided. That is to say, the RLP transmission procedure at the RLP transmitter is simplified. The procedure is not required to perform scheduling for various channels, e.g., 20 ms fundicated channels and 1.25 ms F-PDCH that are with different timing references and frame lengths simultaneously.

The previous descriptions are of preferred examples for implementing the invention, and the scope of the invention should not necessarily be limited by this description. The scope of the present invention is defined by the following claims:

We claim:

1. An apparatus comprising:
a controller positioned in a communication station, the communication station operable in a radio communication system to receive and process communication data sent thereto, wherein the apparatus is configured to control processing of the communication data, wherein the controller is adapted to select at least one of a first operational mode and a second operational mode in which to process the communication data sent to the communication station, selection of said first operational mode and said second operational mode being dependent upon whether a high-speed data channel is assigned, wherein said first operational mode and said second operational mode are different operational modes within a Radio Link Protocol layer.

2. The apparatus of claim 1, wherein the communication station comprises a mobile station and wherein said controller is embodied at the mobile station.

3. The apparatus of claim 2, wherein the mobile station is configured to communicate communication data, the communication data formatted to be at least one of a first format-type and of a second format-type, such that, when of the first format-type, the communication data is formed of frames of a first frame length and, when of the second format-type, the communication data is formed of frames of a second frame length, the second frame length fractionally related to the first frame length.

4. The apparatus of claim 3, wherein the radio communication system is defined in terms of logical layers including the Radio Link Protocol layer and the first format-type and the second format-type comprise Radio Link Protocol layer formatting types, wherein said controller is configured to select which of the first and second operational modes to process the data at the Radio Link Protocol layer.

5. The apparatus of claim 4, wherein the first format-type comprises 1xRTT formatting, wherein the communication data sent to the communication station comprises 1xRTT data, and wherein said controller is configured to process the 1xRTT data in the first operational mode.

6. The apparatus of claim 5, wherein the second format-type comprises 1xEV-DV formatting, wherein the communication data sent to the communication station comprises 1xEV-DV data, and wherein said controller is configured to process the 1xEV-DV data in the second operational mode.

7. The apparatus of claim 3, wherein the first format-type into which the communication data is formable defines frames of the first frame lengths, wherein the first operational mode comprises a frame mode in which the data of successive frames of the first frame length are processed.

8. The apparatus of claim 7, wherein the first frame length comprises a twenty millisecond fram length and wherein, when said controller selects the frame mode, the data is processed at twenty millisecond intervals.

9. The apparatus of claim 8, wherein the second format-type into which the communication data is formable defines time-slot formatted data, wherein each time slot is of the second frame length and the first frame length is a multiple of the second frame length-lengths, wherein the second operational mode selectable by said controller comprises a slot mode in which the communication data of successive time slots of the second frame length are processed.

10. The apparatus of claim 9, wherein the second frame length comprises a 1.25 millisecond length and wherein, when said controller selects the slot mode, the data is processed at 1.25 millisecond intervals.

11. The apparatus of claim 10, wherein the controller is configured to select processing of the communication data in both the frame mode and the slot mode simultaneously.

12. The apparatus of claim 3, wherein the radio communication system defines a forward packet data channel, wherein, in operation, communication data of the second format-type is communicated upon the forward packet data channel and said controller is configured to process the communication data communicated upon the forward packet data channel when the second operation mode is selected.

13. The apparatus of claim 1, wherein the communication station is defined in terms of logical layers including the Radio Link Protocol layer and wherein said controller is embodied at the Radio Link Protocol layer.

14. The apparatus of claim 1, wherein said controller is configured to select processing the communication data in both the first operational mode and the second operational mode simultaneously.

15. The apparatus of claim 4, wherein the second format-type comprises 1xEV-DV formatting, wherein the communication data sent to the communication station comprises 1xEV-DV data, and wherein said controller is configured to process the 1xEV-DV data in the second operational mode.

16. A method for controlling processing of communication data received at a communication station operable in a radio communication system, said method comprising the operations of;

selecting at least one of a first operational mode and a second operational mode in which to process the communication data received at the communication station, selection of said first operational mode and said second operational mode being dependent upon whether a high-speed data channel is assigned, and wherein said first operational mode and second operational mode are different operational modes within a Radio Link Protocol layer; and processing the communication data in the selected at least one operational mode.

17. The method of claim 16, wherein the communication station is defined in terms of logical layers including a Radio Link Protocol layer and wherein said operations of selecting and processing are performed at the Radio Link Protocol layer.

18. The method of claim 16, wherein the selection of the mode during said operation of selecting comprises selection of both the first operational mode and the second operational mode simultaneously.

19. The method of claim 16, wherein the communication station is a mobile station.

* * * * *

UNITED STATES PATENT AND TRADEMARK OFFICE
CERTIFICATE OF CORRECTION

PATENT NO. : 7,363,048 B2  Page 1 of 1
APPLICATION NO. : 10/414482
DATED : April 22, 2008
INVENTOR(S) : Mark W. Cheng et al.

It is certified that error appears in the above-identified patent and that said Letters Patent is hereby corrected as shown below:

In Column 11, Claim 9, Line 38:
    Please replace "frame length-lengths," with --frame length--

Signed and Sealed this

Third Day of March, 2009

JOHN DOLL
*Acting Director of the United States Patent and Trademark Office*